United States Patent
Kostylev et al.

[15] 3,674,099
[45] July 4, 1972

[54] DEVICE FOR MAKING HOLES IN THE GROUND

[72] Inventors: Alexandr Dmitrievich Kostylev; Konstantin Stepanovich Gurkov; Khaim Berkovich Tkach; Lazar Moiseevich Lipovetsky, all of Novosibirsk, U.S.S.R.

[73] Assignee: Institut Gornogo Dela Siberskogo otdelenia Akademii, Nauk SSSR, U.S.S.R.

[22] Filed: Dec. 30, 1970

[21] Appl. No.: 102,675

[52] U.S. Cl. .............................. 175/20, 175/102, 175/389
[51] Int. Cl. .................................. E21b 11/02, E21b 9/22
[58] Field of Search ........................ 175/20, 385, 389, 102

[56] References Cited

UNITED STATES PATENTS 1,188,001  6/1916  May........................................175/385
2,485,826 10/1949  Harinck..................................175/385
3,599,732  8/1971  Kroon.....................................175/20

FOREIGN PATENTS OR APPLICATIONS 801,615  9/1958  Great Britain........................175/102

Primary Examiner—Richard E. Moore
Assistant Examiner—Lawrence J. Staab
Attorney—Holman & Stern

[57] ABSTRACT

A device for making holes in the ground has a driving unit adapted to compact the ground and mounting an expansion reamer with an adjoining hopper adapted to receive the ground broken by the reamer, said hopper being provided with pneumatic means for the removal of the ground from the hopper outside the hole.

4 Claims, 1 Drawing Figure

PATENTED JUL 4 1972    3,674,099
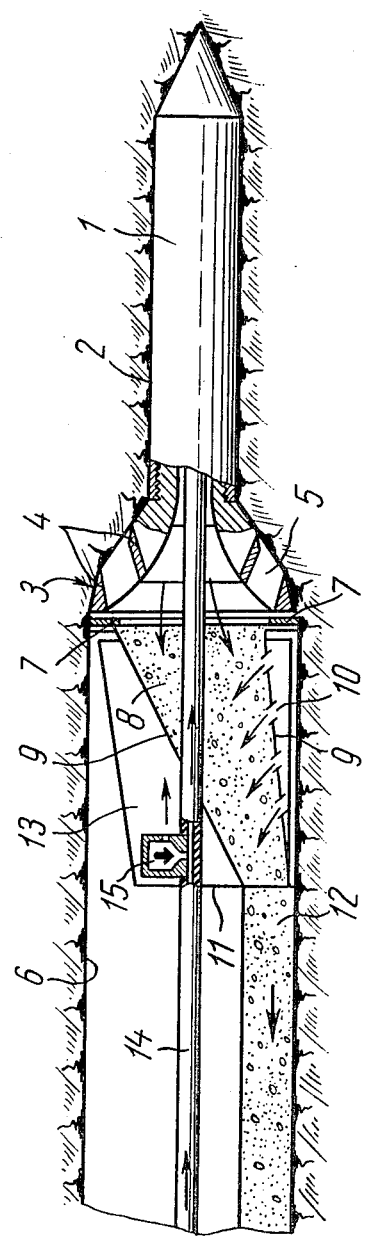

DEVICE FOR MAKING HOLES IN THE GROUND

The present invention relates to devices designed for making holes in the ground and, more particularly, it relates to such devices that are capable of concurrently driving an advance hole by compacting the ground and reaming said hole by mechanically breaking the ground on it walls.

The invention is mainly intended for making holes under the roadbed of railroads and highways with a view of effecting the trenchless laying of pipes and cables and can be used with a self-propelled driving unit, in particular, percussive one, or with a working tip adapted to be forced through the ground by some power mechanism for making a hole.

It has been known to make such holes by way of compacting the ground with the aid of self-propelled pneumatic percussive mechanisms. It is relatively easy to make small holes using this technique.

When making big holes, the ground resistance to compaction increases to such an extent that the existing sources of energy used for the purpose are incapable of generating the power required or their use becomes unprofitable.

With a view to reducing the power consumption of the process, there has been developed a combination method of making big holes, disclosed in another application by the present Applicant.

The latter method consists in simultaneously driving an advance hole by compacting the ground and reaming said hole by removing the ground from its walls, the broken ground being carried out by compressed air.

The device designed for accomplishing said method comprises a driving unit (self-propelled pneumatic percussive mechanism) with a mechanical reamer featuring ports for the passage of the ground being removed.

When driving a relatively big hole, the amount of air exhausted by the driving unit is not enough for an efficient removal of the ground from the hole, the rate of the air flow decreasing. Therefore, a considerable amount of air is to be supplied to the hole for attaining the required rate of the ground removal.

It is an object of the present invention to eliminate the aforementioned disadvantages of the known devices.

This invention is aimed at the solution of a technical problem of developing an improved device providing for a more effective removal of the broken ground from the hole at a relatively low consumption of compressed air irrespective of the diameter of the hole being made.

Disclosed herein is such a device for making holes in the ground, comprising a driving unit adapted to effect the driving of an advance hole by compacting the ground, and a mechanical reamer mounted on said driving unit and featuring ports for the passage of ground being cut from the walls of the advance hole, the ground being removed from the hole with the aid of compressed air. According to the present invention, said problem is solved owing to the fact that the rear side of the reamer is adjoined by a hopper adapted to receive the broken ground, said hopper being provided with a pipeline for the removal of the ground and with openings in its walls, and that the hopper is adjoined by a hermetically sealed chamber communicating with a source of compressed air supplied inside the hopper through the openings in the walls of the latter for conveying the ground from said hopper to the removing pipeline and, via the latter, out of the hole.

It is desirable that the hopper be attached directly to the rear side of the reamer and that resilient shock-absorbing members be arranged between them.

For a better advance of the ground in the hopper, it is expedient that the side walls of the latter be inclined in a direction away from the reamer.

It is expedient that the hermetically sealed chamber be arranged around the hopper, and that the openings for the passage of air be made in the side wall of the hopper.

The advantage of the present invention resides in the fact that the provision of the hopper with the removing pipeline makes for the rate of air flow that is sufficient for the removal of the ground, without any significant increase in the consumption of compressed air, owing to the fact that the cross-section of the removing pipeline is smaller than the cross-section of the hole.

Presented hereinbelow for a better understanding of the invention is a detailed description of the preferred embodiment thereof, reference being had to the accompanying drawing which shows a device, according to the present invention, incorporating a self-propelled pneumatic driving unit.

Referring now to the drawing, the proposed device incorporates a driving unit 1, preferably a pneumatic percussive mechanism such as disclosed in British Pat. Nos. 1,152,249 and 1,170,167, U. S. Pat. No. 3,580,014 and French Pat. No. 1,515,348, all issued in the name of the present Applicant.

The driving unit 1 under the effect of impacts delivered thereupon drives, by compacting the ground, a small advance hole 2. Rigidly attached to the driving unit 1 closer to or on the tail piece thereof is a mechanical reamer 3 in the form of a plurality of concentrically arranged cutters 4 adapted for the removal of ground from the walls of the advance hole 2, provision being made between the cutters 4 of ports 5 for the passage of ground being removed.

The reamer 3 serves for forming a final hole 6.

Attached to the rear side of the reamer 3 with the aid of resilient shock-absorbing members 7 (rubber spacers) is a hopper 8 adapted to receive the ground broken by the cutters 4, said ground being supplied through the ports 5 between the cutters 4.

For a better advance of the ground in the hopper 8, side walls 9 of the latter are inclined in a direction away from the reamer 3, part of said side walls featuring openings 10 adapted for the passage of compressed air inside the hopper 8.

At the outlet from the hopper 8, to its end wall 11 is attached a pipeline 12 which extends beyond the hole 6 and is designed for the removal of ground under the effect of compressed air supplied to the hopper 8. Air enters the hopper 8 through the openings 10 from a hermetically sealed chamber 13 arranged around the hopper side walls 9 and connected via hose 14 to a source of compressed air (not shown in the drawing).

When using the afore-cited pneumatic percussive mechanism as the driving unit 1, compressed air is supplied thereto via the hose 14. In this case, it is expedient that on the hose 14 there should be mounted a pressure valve 15 serving to ensure the supply of air to the chamber 13 and maintain the pressure of air at the inlet to the percussive mechanism for normal operation thereof, air exhausted by said mechanism being discharged to the hopper 8 thus making for a better removal of the ground from the latter to the removing pipeline 12.

The device proposed herein operates in the following manner.

Upon the supply of compressed air via the hose 14, the driving unit 1 (pneumatic percussive mechanism) under the effect of impacts delivered thereupon starts penetrating the ground to form the advance hole 2. Concurrently with the penetration of the driving unit 1, the cutters 4 of the reamer 3 cut the ground off the walls of the hole 2 to form the final hole 6.

The ground being broken passes through the ports 5 between the cutters 4 into the hopper 8. Air exhausted by the driving unit 1, as well as air supplied to the chamber 13, enters the hopper 8, takes up particles of the broken ground and carries them along the pipeline 12 outside the hole 6.

Air is supplied via the hose 14 in a presumably greater amount than that required for operation of the driving unit 1. Excessive compressed air is directed via the pressure valve 15 to the chamber 13 and further to the hopper 8, as mentioned above.

When the driving unit 1 is a working tip (not shown in the drawing) forced through the ground by a power mechanism (not shown in the drawing), compressed air is supplied to the chamber 13 and thence to the hopper 8.

The device according to the present invention makes for an efficient driving of holes using relatively simple means.

We claim:

1. A device for making holes in the ground by concurrently driving an advance hole and reaming the latter, comprising: a driving unit serving to make an advance hole by compacting the ground; a mechanical reamer mounted on said driving unit and featuring ports for the passage of ground being cut from the walls of the advance hole; a hopper adapted to receive the broken ground, adjoining the rear side of said reamer and provided with openings in its walls for the supply of compressed air; a pipeline adapted for the removal of the broken ground out of the hole and communicating with said hopper; a source of compressed air; and a hermetically sealed chamber adjoining said hopper and communicating with said source of compressed air which is supplied inside the hopper for conveying the ground from the latter to said removing pipeline and, along said pipeline, out of the hole.

2. A device as set forth in claim 1, wherein said hopper is attached directly to the rear side of the reamer and resilient shock-absorbing members are arranged between them.

3. A device as set forth in claim 1, wherein the side walls of said hopper are inclined in a direction away from said reamer.

4. A device as set forth in claim 1, wherein said hermetically sealed chamber is arranged around said hopper, while the openings adapted for the passage of air are made in the side wall of the hopper.

* * * * *